(12) United States Patent
Okuda et al.

(10) Patent No.: US 6,593,983 B2
(45) Date of Patent: *Jul. 15, 2003

(54) LOW POWER CONSUMPTION LIQUID CRYSTAL DISPLAY SUBSTRATE

(75) Inventors: Shoji Okuda, Kasugai (JP); Makoto Ohashi, Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/434,646

(22) Filed: Nov. 5, 1999

(65) Prior Publication Data
US 2002/0063823 A1 May 30, 2002

(30) Foreign Application Priority Data
Jun. 14, 1999 (JP) .............................. 11-166979

(51) Int. Cl.$^7$ .................. G02F 1/1335; G02F 1/136; G02F 1/1333; G02F 1/13; G02F 1/03
(52) U.S. Cl. .................... 349/113; 349/43; 349/138; 349/187; 430/20
(58) Field of Search .................. 349/43, 44, 138, 349/113, 187; 430/5, 6, 20; 257/59, 72

(56) References Cited

U.S. PATENT DOCUMENTS

| | | | | |
|---|---|---|---|---|
| 4,955,697 A | * | 9/1990 | Tsukada et al. | ............. 350/332 |
| 5,208,690 A | * | 5/1993 | Hayashi et al. | ................ 359/59 |
| 5,327,001 A | * | 7/1994 | Wakai et al. | ................ 257/350 |
| 5,721,601 A | * | 2/1998 | Yamaji et al. | ............... 349/138 |
| 5,739,890 A | * | 4/1998 | Uda et al. | .................... 349/156 |
| 6,013,399 A | * | 1/2000 | Nguyen | .......................... 430/5 |
| 6,040,888 A | * | 3/2000 | Masami et al. | ............. 349/155 |
| 6,057,904 A | * | 5/2000 | Kim et al. | .................. 349/143 |

* cited by examiner

Primary Examiner—Tarifur R. Chowdhury
(74) Attorney, Agent, or Firm—Greer, Burns & Crain, Ltd.

(57) ABSTRACT

The present invention relates to a reflection type liquid crystal display for displaying images by reflecting the external light and a fabricating method thereof and its object is to provide a liquid crystal display and a fabricating method thereof which can prevent a color tone of the reflection light and the like from a deterioration by surely absorbing an incident light from a gap between display electrodes. After forming a interlayer insulating film 24 on a source electrode 22 of FET formed on a silicon substrate 1 and planarizing the surface thereof by a CMP and the like, an insulating reflection preventing film 26 is formed. The source electrode 22 and a metal layer 29 are connected by embedding a connecting conductor 30 at a through-hole passing through the reflection preventing film 26 and the interlayer insulating film 24. Similarly, After forming an interlayer insulating film 24' on the metal layer 29 and planarizing thereon, an insulating reflection preventing film 26' is formed. The metal layer 29 and a display electrode 32 are connected by embedding a through-hole passing through the reflection preventing film 26' and the interlayer insulating film 24'.

12 Claims, 7 Drawing Sheets

LOW POWER CONSUMPTION LIQUID CRYSTAL DISPLAY SUBSTRATE

BACKGROUND OF THE INVENTION

1. Field of the Invention

The present invention relates to a liquid crystal display substrate and a fabricating method thereof and a liquid crystal display, in particular to a reflection type liquid crystal display which can realize a low consumption electric power by reflecting an external light and displaying images and a liquid crystal display substrate used therefor and a fabricating method thereof.

2. Description of the Related Art

Among reflection type displays using a light valve for a light modulation, a projection type display using a liquid crystal light valve what is so called a liquid crystal projector can display a very high definition and a large image display, thereby having a possibility to replace CRTs in near future. The projection type display displays images using a transmission type or reflection type liquid crystal light valve. Among them, the conventional reflection type liquid crystal display described in Japanese Laid-open Patent Application No. 8-248425 and the U.S. counterpart Pat. No. 5,739,890 is described with reference to FIG. 9. FIG. 9 shows a schematic cross sectional view of the conventional reflection type liquid crystal light valve. A transistor 104, a detailed picture thereof is omitted, is formed on a silicon substrate 100. A silicon oxide film 102 is formed on the silicon substrate 100 and the transistor 104, and a reflection preventing film 106 using titanium nitride (TiN) is formed on the silicon oxide film 102.

A metal layer 111 is formed on the reflection preventing film 106 as an inter-wire layer via the silicon oxide film 108. A silicon oxide film 102' is formed on the metal layer 111 as the first insulating film and a reflection preventing film 106' using TiN is formed on the silicon oxide film 102'. A silicon oxide film 108' is formed on the reflection preventing film 106' as the second insulating film and a display electrode 112 which is made of aluminum (Al) and also functions as a light reflecting film is formed thereon.

The display electrode 112 is connected to the metal layer 111 by a connecting conductor 110' working as a plug electrode, for example, made of tungsten (W) and embedded in a through-hole formed at the silicon oxide film 102' and silicon oxide film 108'. Further, the metal layer 111 is connected to a source electrode (not shown) of the transistor 104 by a connecting conductor 110 of tungsten embedded in a through-hole formed at the silicon oxide film 102 and silicon oxide film 108. An Al layer is not formed between the adjacent display electrodes 112, and the reflection preventing film 106' is arranged at least at a lower layer between the display electrodes 112. A glass substrate 116 as an opposing substrate is arranged via a spacer not shown. An opposing electrode 114 is formed on the whole surface of the display electrode 112 side of the glass substrate 116. Furthermore, a liquid crystal 120 is sealed between the opposing electrode 114 and the display electrode 112 at a predetermined cell gap.

The transistor 104 is a FET (field effect transistor) in which, other than the source electrode, a drain electrode connected to data lines and a gate electrode (these are not shown) connected to scanning lines are formed, and the transistor 104 functions as a switching element which applies a voltage applied to data lines when a gate is in the ON state to the display electrode 112.

By changing a transmissivity of the light by changing the direction of liquid crystal molecules 122 in response to a voltage applied between the display electrode 112 and the opposing electrode 114 when the transistor 114 is ON, an incident light from the glass substrate 116 side is reflected by the display electrode 112 and then re-emits from the glass substrate 116 or the light is prevented from reaching to the display electrode 112, thereby a gradation display being performed.

In FIG. 9, though a connection between the display electrode 112 and a source electrode (not shown) of the transistor 104 is made by a drawing-around of the metal layer or the like as a inter-wire layer, an arrangement of this inter-wire layer is not required as long as the relationship of arrangement of the connection between the transistor 104 and the light reflection film 112 coincides.

Further, the silicon oxide films 102, 102', 108' and the like which are interlayer insulating films are HDP films formed by a high density plasma (HDP) CVD method and their upper surfaces are performed a planarization process by a polishing process such as a CMP (Chemical Mechanical Polishing) method thereon. In the reflection type liquid crystal display, the planarization of the interlayer insulating film which is a lower layer of the display electrode 112 is important and the surface of the display electrode 112 can be planarized by the planarization of the interlayer insulating film, thereby improving the reflectance of the external light.

Further, the conventional reflection type liquid crystal display shown in FIG. 9 uses TiN as a forming material for the reflection preventing films 106 and 106'. Since TiN has a light absorption function, TiN can prevent the generation of deterioration of the color tone and the like which occurs due to the reflection of the incident light from the gap between the display electrodes 112. It should be noted that in case of the conventional reflection type liquid crystal display, the reflection preventing film 106 is also arranged between the display electrode 112 and the inter-wire layer other than the gap between the display electrodes 112.

In the meantime, TiN used as the forming material for the reflection preventing films 106 and 106' has a conductivity. Therefore, when the contact holes which connect between the display electrode 112 and the metal layer 111 and between the metal layer 111 and the transistor 104 are directly formed at the reflection preventing films 106 and 106', TiN which is the forming material for the reflection preventing films 106 and 106' exposes on the inner faces of the contact holes, so the embedding of the contact holes by the connecting conductors 110 and 110' results in a problem for shortage of all display electrodes.

Therefore, opening the windows having a diameter larger than a diameter of the contact holes at predetermined positions of the reflection preventing films 106 and 106', the contact holes are formed in the windows so that the contact holes do not contact to the rims of the windows. For this reason, a patterning for forming the windows at the reflection preventing films 106 and 106' are required. Further, with respect to the formation of the contact holes, an alignment is required so that the contact holes do not contact with the rims of the windows formed to the reflection preventing films 106 and 106'. At this time, when the windows with the larger diameter are formed at the reflection preventing films 106 and 106' having an alignment margin to assure the insulation between the connecting conductors 110 and 110' and the reflection preventing films 106 and 106', the gap between the display electrodes 112 overlaps the windows of the reflection preventing films 106 and 106', thereby causing a problem that the incident light from the gap between the display electrodes 112 can not be absorbed at the reflection preventing films 106 and 106'.

SUMMARY OF THE INVENTION

An object of the present invention is to provide a liquid crystal display substrate and a fabricating method thereof and a liquid crystal display which can prevent a color tone of a reflection light and the like from deterioration by surely absorbing an incident light from a gap between display electrodes.

The above object is achieved by a fabricating method of a liquid crystal display substrate comprises steps of forming a first insulating film on an electrode connected to switching element, the first insulating film having a more planarized surface than a step difference made by the electrode, forming a insulating reflection preventing film on the first insulating film by a plasma CVD method, forming a through-hole which passes through the reflection preventing film and the first insulating film and exposes a connecting portion of the electrode, and forming a display electrode on an upper layer side of the reflection preventing film, the display electrode having a function for reflecting an incident light and being connected to the electrode via a connecting conductor provided in contact with an inner surface of the through-hole.

Further, above object is achieved by a liquid crystal display substrate comprising a first insulating film provided on an electrode connected to a switching element, the first insulating film having a more planarized surface than a step difference made by the electrode, an insulating reflection preventing film provided on the first insulating film by a plasma CVD method, and a display electrode provided on an upper layer side of the reflection preventing film, the display electrode having a function for reflecting an incident light and connected to the electrode via a connecting conductor provided in contact with an inner surface of a through-hole passing through the reflection preventing film and the first insulating film.

BRIEF DESCRIPTION OF THE DRAWINGS

The present invention is further described in connection with the accompanying drawings, in which.

DESCRIPTION OF THE PREFERRED EMBODIMENT

Figure 1:
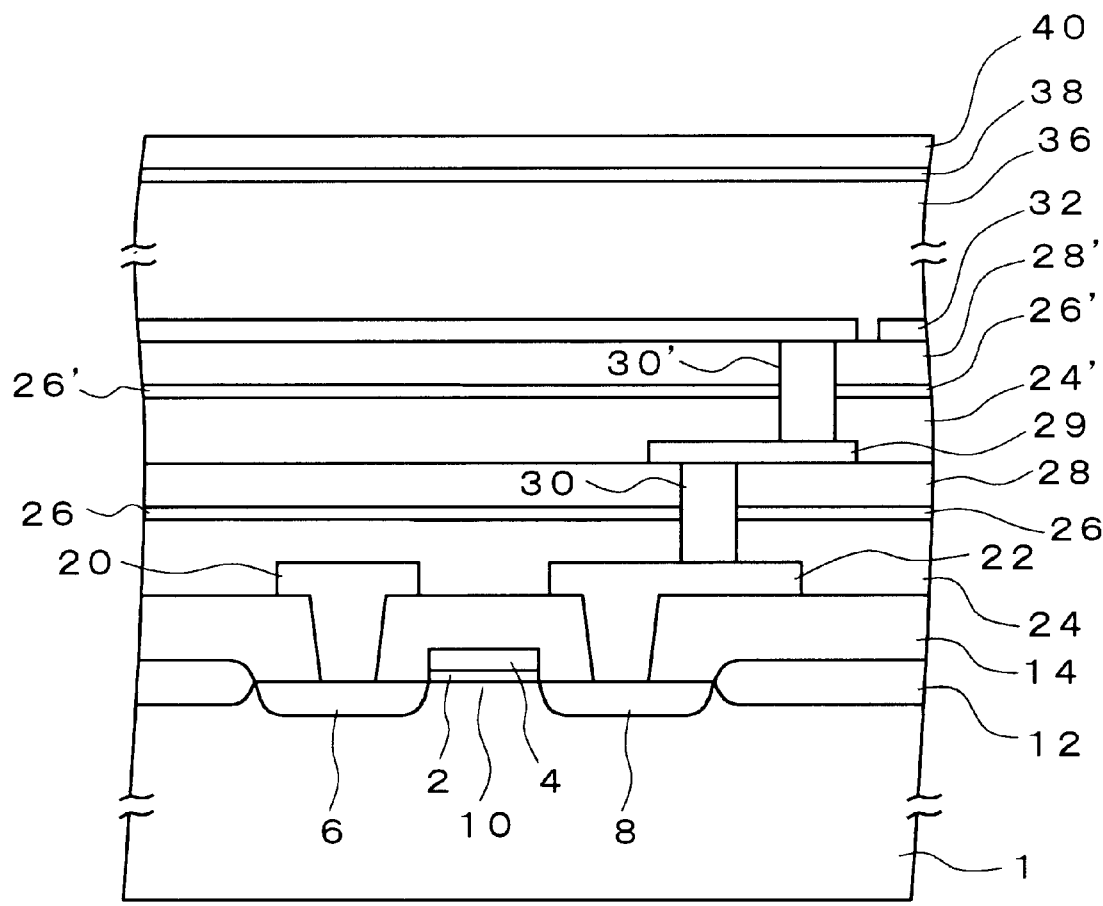
FIG. 1 is a partial cross sectional view showing a schematic structure of a reflection type liquid crystal display (substrate) according to an embodiment of the present invention.
Figure 2:
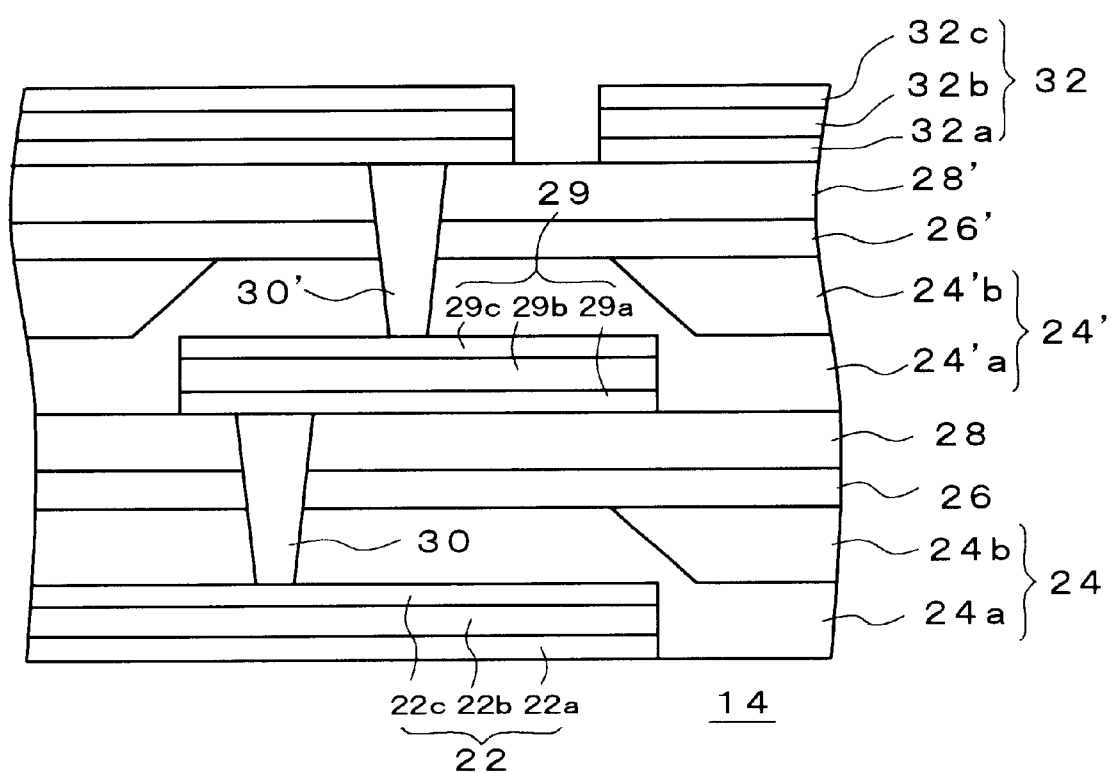
FIG. 2 is a partial cross sectional view showing a detailed structure of the reflection type liquid crystal display (substrate) according to an embodiment of the present invention.

A liquid crystal display substrate, a fabricating method thereof and a liquid crystal display according to an embodiment of the present invention is described with reference to FIG. 1 through FIG. 8. First, a schematic structure of the liquid crystal display according to this embodiment is described with reference to FIG. 1 and FIG. 2. FIG. 1 shows a partial cross sectional view of the liquid crystal display and FIG. 2 shows a partially enlarged view of FIG. 1. A field oxide film 12 is formed on a semiconductor substrate which is, for example, a silicon substrate 1 and each FET (field effect transistors) is respectively formed at a plurality of areas allocated by the field oxide film 12. The FET has a gate insulating film 2 formed on the silicon substrate 1 and a gate electrode 4 formed thereon. A drain area 6 and a source area 8 are formed in the silicon substrate 1 at both side areas of the gate electrode 4. Further, a channel area 10 is formed on the silicon substrate 1 under the gate electrode 4. An interlayer insulating film 14 of the silicon oxide film is formed on the FET. It should be noted that though a storage capacity line is formed in the interlayer insulating film 14, the figure is omitted.

A data line 20 and a source electrode 22 are formed on the interlayer insulating film 14, the data line 20 is connected to the drain area 6 of the FET via a contact hole, and the source electrode 22 is connected to the source area 8 via a contact hole. As shown in FIG. 2, the source electrode 22 is formed by being laminated by TiN layer 22a, AlCu layer 22b and TiN layer 22c in this order.

An interlayer insulating film 24 of the silicon oxide film is formed on the source electrode 22. The interlayer insulating film 24 consists of a silicon oxide film (HDP-SiO film, hereinafter) 24a formed by a high density plasma chemical vapor deposition method (hereinafter abbreviated as a HDP-CVD method) and a silicon oxide film 24b (P-SiO film, hereinafter) formed by a plasma chemical vapor deposition method (PCVD method, hereinafter) on the HDP-SiO film 24a.

An insulating reflection preventing film 26 is planarized and formed on the interlayer insulating film 24. The reflection preventing film 26 is, for example, a silicon nitride film (P-SiN film) formed by the P-CVD method or a silicon oxide nitride film (P-SiON film).

An interlayer insulating film 28 of the P-SiO film is formed on the reflection preventing film 26. A metal layer 29 is formed on the interlayer insulating film 28. The metal layer 29 is, as shown in FIG. 2, laminated by a TiN layer 29a, AlCu layer 29b and TiN layer 29c in this order. An interlayer insulating film 24' is formed on the metal layer 29 as a first insulating film. The interlayer insulating film 24' consists of a HDP-SiO film 24'a formed by the HDP-CVD method and a P-SiO film 24'b formed on the HDP-SiO film 24a by the P-CVD method.

An insulating reflection preventing film 26' is planarized and formed on the interlayer insulating film 24'. The reflection preventing film 26' is also formed by the P-SiN film or P-SiON film as is the case of the reflection preventing film 26.

An interlayer insulating film 28' is formed on the reflection preventing film 26' as a second insulating film by depositing the P-SiO film by the P-CVD method and a display electrode 32 which also functions as a light reflection film is formed thereon. As shown in FIG. 2, the display electrode 32 is formed by being laminated by a TiN layer 32a, Ti layer 32b and AlCuTi layer 32c in this order. The TiN layer 32a, Ti layer 32b and AlCuTi layer 32c may be laminated to form the display electrode 32.

The display electrode 32 is connected to the metal layer 29 via a connecting conductor 30' which is a plug electrode, for example, made of tungsten where the connecting conductor 30' is embedded in the through-hole formed via the interlayer insulating film 24', reflection preventing film 26' and interlayer insulating film 28'. Further, the metal layer 29 is connected to the source electrode 22 of the FET by the connecting conductor 30 of tungsten embedded in the through-hole formed at the interlayer insulating film 24, reflection preventing film 26 and interlayer insulating film 28. The light reflection layer is not formed between the adjacent display electrodes 32 and the reflection preventing film 26' is arranged at least at the lower layer between the display electrodes 32.

The display electrode 32 is formed to each of a plurality of FETs and structures a sub-pixel of a display pixel by a display electrode 32. Each display electrode 32 is separated at a predetermined distance. Further, a glass substrate 40, on which an opposing electrode 38 made of ITO (Indium, Tin, Oxide) is formed, is arranged facing the display electrode 32. A liquid crystal layer 36 in which a liquid crystal material is sealed exists at an area between the display electrode 32 and opposing electrode 38.

The display electrode 32 has a light reflection function for reflecting the light incident from the glass substrate 40 side as well as a function for applying a voltage to the liquid crystal layer 36. The FET functions as a switching element, which applies a signal voltage supplied to the data line 20, to the display electrode 32 which is a light reflection film when the gate electrode 4 is in the ON state. The transmissivity of the light is changed by changing the orientation of liquid crystal molecules (not shown) according to the voltage applied between the display electrode 32 and the opposing electrode 38 when the FET is ON. Thereby, the incident light from the glass substrate 40 side is re-emitted or not transmitted by being passed through or reflected to the display electrode 32 which works as a light reflection film, so performing a display.

Thus, according to the structure in this embodiment, even if the connecting conductors 30 and 30' which connect the display electrode 32 with the source electrode 22 of the FET formed thereunder directly contact with the reflection preventing films 26 and 26', a shortage between the connecting conductors 30 and 30' and the reflection preventing films 26 and 26' does not occur because the reflection preventing films 26 and 26' are made of an insulating material. In short, a process to in advance form windows for passing through the contact holes at the reflection preventing films 26 and 26' is not required. Therefore, the contact holes can be formed at a time at the reflection preventing films 26 and 26' and at the interlayer insulating films 24 and 24', which are the first insulating films and are lower layers of the reflection preventing films 26 and 26', in the same photolithography process.

Further, when the interlayer insulating films 24, 28, 24' and 28' are filmed thickly, the contact holes connecting each layer become deeper. The deeper the contact holes are, the coverage of the connecting conductors 30 and 30' embedded in the contact holes is aggravated. On the contrary, according to the structure in this embodiment, the surface of the reflection preventing film can be directly planarized because the insulating reflection preventing films 26 and 26' are used. In short, since the planarized films are further required to be formed on the reflection preventing films 26 an 26', the lower layer of the display electrode 32 can be planarized preventing the interlayer insulating films 24, 28, 24' and 28' from filming thickly.

Figure 3A:
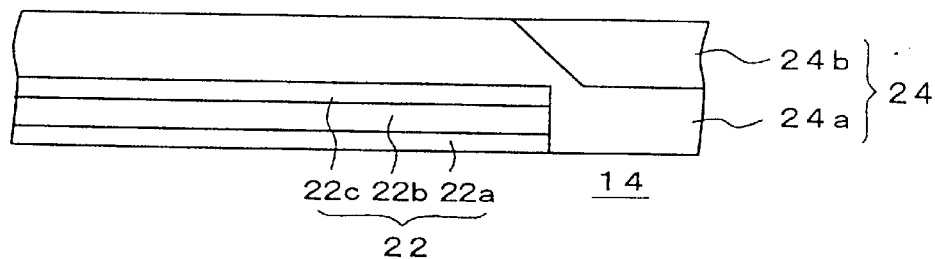
FIGS. 3A through 3C are views describing a fabricating method of the reflection type liquid crystal display (substrate) according to an embodiment of the present invention.
Figure 3B:
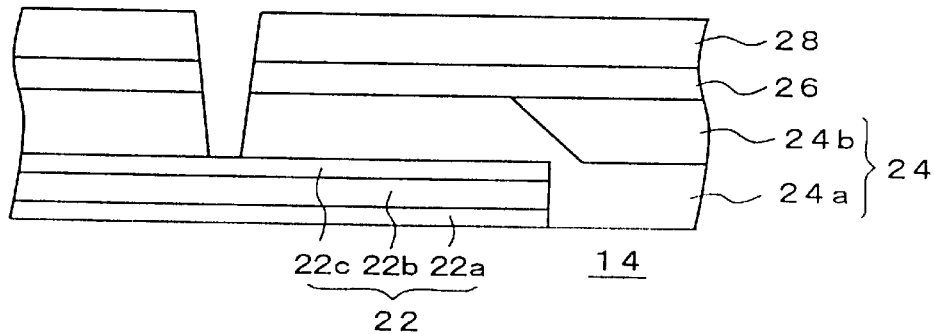
Figure 3C:
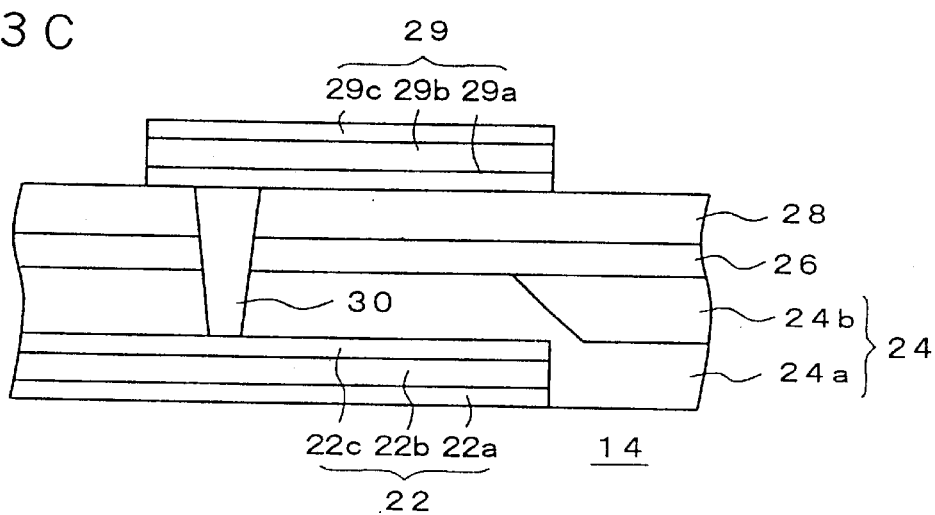

Next, the fabricating method of the liquid crystal display substrate according to this embodiment is described with reference to FIG. 3A through FIG. 4C. show a fabricating process corresponding to the partial cross section shown in FIG. 2. Since FIG. 3A through FIG. 3C shows a status where the FET and the silicon oxide film 14 which is an interlayer insulating film have been already formed, a process to come to the status of FIG. 3A is first described briefly. First, element formation areas of a plurality of the FET are established by forming the field oxide film 12 on the silicon substrate 1. Next, after forming an insulating film on the silicon substrate 1 in the element formation areas, a polysilicon film is deposited by the P-CVD method and then the gate insulating film 2 and the gate electrode 4 are formed by patterning.

Next, the drain area 6 where the source area 8 are formed by adding and diffusing impurities on both sides of the gate electrode 4 using an ion implantation and the like. Next, the interlayer insulating film 14 of the P-SiO film is formed by the P-CVD method. After opening a contact hole at the interlayer insulating film 14, the data line 20 and source electrode 22 are formed by laminating the TiN layer 22a, AlCu layer 22b and TiN layer 22c in this order.

After the completion of the above processes, as shown in FIG. 3A the HDP-SiO film 24a is deposited on the whole surface by the HDP-CVD method and then the P-SiO film 24b is deposited by the P-CVD method. The interlayer insulating film 24 planarized the surface thereof by being polished by the CMP method is formed thereafter. The P-SiO film 24b functions as a sacrifice film during the polishing process by the CMP method. In an example shown in FIG. 3A, though the interlayer insulating film 24 on the source electrode 22 is formed by the HDP-SiO film 24a and the P-SiO film 24b, the interlayer insulating film 24 may be formed by a unit of HDP-SiO film 24a.

In this embodiment, though the embedding between the wires is performed by the HDP-CVD method, a method using a SOG (Spin On Glass) film may be used instead of the HDP-CVD method. Further, a method which deposits a P-SiO film on the SOG film and then planarizes thereon by the CMP method can be used. Furthermore, the SOG film mixing the dyestuffs can also be used as the interlayer insulating film 24.

When the embedding between the wires and the planarization process by the CMP method are completed, as shown in FIG. 3B, the reflection preventing film 26 is formed by depositing the P-SiN film on the whole surface by, for example, the P-CVD method. Since the surface of the interlayer insulating film 24 which is the lower layer is performed the planarization process, the reflection preventing film 26 is formed with a high flatness as well. The reflection preventing film 26 may use the P-SiON film instead of the P-SiN film.

In an example of the deposition conditions of the P-SiN film used for the reflection preventing film 26 shown below;

Gas discharge ratio: $SiH_4/NH_3/N_2$=155/900/900 (sccm);

Space between the electrodes: 600 (mils) (here, 1000 mils=1 Inch);

RF output: 120 (W);

Pressure in a chamber: 3.0 (Torr);

Deposition temperature: 400 (° C.);

the reflection preventing film 26 having a refractive index equal to 2.24 and an attenuation coefficient equal to 0.636 is obtained. Also, in another deposition condition as below;

Gas discharge ratio: $SiH_4/N_{2O}/N_2$=60/120/1900 (sccm);

Space between the electrodes: 475 (mils);

RF output: 100 (W);

Pressure in a chamber: 6.5 (Torr);

Deposition temperature: 350 (° C.);

the reflection preventing film 26 having a refractive index equal to 1.98 and an attenuation coefficient equal to 0.47 is obtained. By changing the deposition condition such as a gas discharge ratio, RF output, pressure in a chamber, deposition temperature or the like, a P-SiN film having a desired refractive index or attenuation coefficient can be obtained.

Next, the interlayer insulating film 28 of the P-SiO film is formed on the reflection preventing film 26 by using the P-CVD method. After forming the interlayer insulating film 28, the interlayer insulating film 28, the reflection preventing film 26 and the HDP-SiO film 24a are at a time patterned in the lithography process, thereby forming the contact hole.

Next, as shown in FIG. 3 (c), the connecting conductor 30 exposing its upper portion above the planarized interlayer insulating film 28 is formed by embedding the contact hole by an adhesion layer (glu-layer) and tungsten and removing the adhesion layer and tungsten except for the contact hole by polishing the surface by the CMP method.

Next, by patterning after laminating the TiN layer 29a, AlCu layer 29b and TiN layer 29c on the interlayer insulating film 28 in this order, the metal layer 29 connected to the connecting conductor 30 is formed.

In this embodiment, a tungsten (W)-plug is used for the formation of the connecting conductor 30 for connecting the source electrode 22 with the metal layer 29 because a good flatness at each wire layer can be obtained. The planarization process uses the CMP method suitable for tungsten. Though the adhesion layer and tungsten can be removed by etching other than the CMP method except for the contact hole, it should be noted that recesses at the upper portion of the contact hole are produced in this case and the flatness of the wires may be deteriorated.

Though the display electrode 32 is arranged at the position pixels are structured, a plurality of wire layers may be required depending on a relationship between the arrangement position and the arrangement of the switching element. In this case, it is possible to provide a further wire layer directly on the reflection preventing film 26 or via the insulating film and to provide a further display electrode 32 on the wire layer. In this case, the surface of each insulating film may be performed a planarization process. Furthermore, it is possible to further provide a reflection providing film between the display electrodes from the insulating film.

Figure 4A:
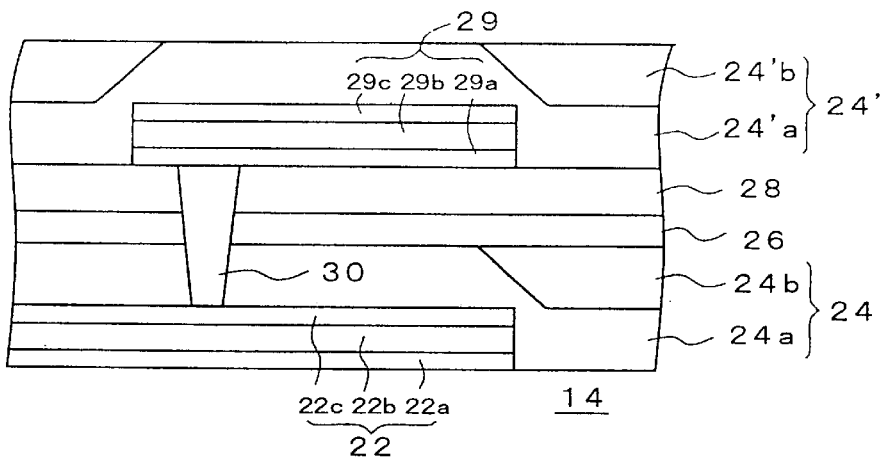
FIGS. 4A through 4C are views describing a fabricating method of the reflection type liquid crystal display (substrate) according to an embodiment of the present invention.

Therefore, as shown in FIG. 4 (a), after depositing the HDP-SiO film 24'a on the whole surface by the HDP-CVD method and then depositing the P-SiO film 24'b by the P-CVD method, the interlayer insulating film 24' planarized by being polished the whole surface thereof by the CMP method is formed. The P-SiO film 24'b functions as the sacrifice film during the polishing process by the CMP method. In an example in FIG. 4A, though the interlayer insulating film 24' on the metal layer 29 is formed by the HDP-SiO film 24'a and P-SiO film 24'b, the interlayer insulating film 24' may be formed by a unit of the HDP-SiO film 24'a. In this process, the SOG film may be used instead of embedding between the wires by the HDP-CVD method as well. Further, after depositing the P-SiO film on the SOG film, the P-SiO film may be planarized thereon by the CMP method. Furthermore, the SOG film mixed with the dye-stuffs can also be used as the interlayer insulating film 24'.

Figure 4B:
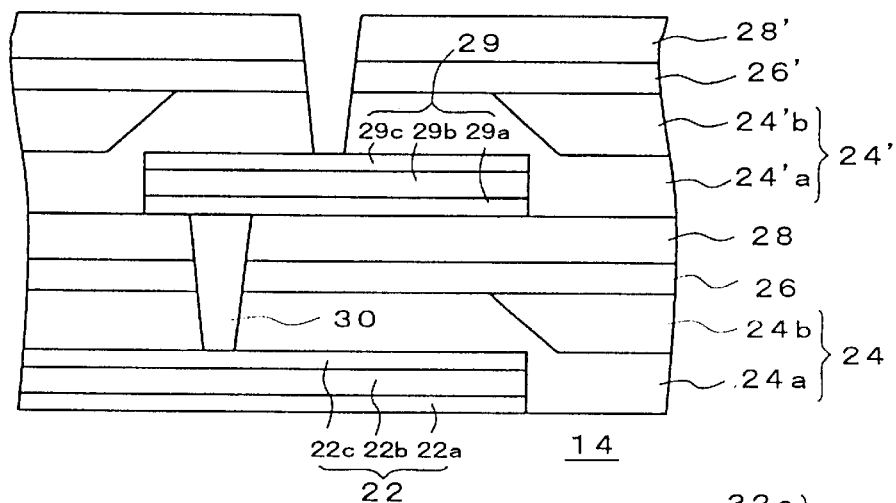

When the embedding between the wires and the planarization process by the CMP method are completed, as shown in FIG. 4B, the reflection preventing film 26' is formed by depositing the P-SiN film on the whole surface by, for example, the P-CVD method. Since the interlayer insulating film 24' which is a lower layer is formed flatly, the reflection preventing film 26' is also formed flatly. As is the case of the reflection preventing film 26, the reflection preventing film 26' may use the P-SiON film instead of the P-SiN film.

Next, the interlayer insulating film 28' of the P-SiO film is formed on the reflection preventing film 26' using the P-CVD method. After forming the interlayer insulating film 28', the interlayer insulating film 28', reflecting preventing film 26' and HDP-SiO film 24'a are at a time patterned in the photolithography process, thereby forming the contact holes.

Figure 4C:
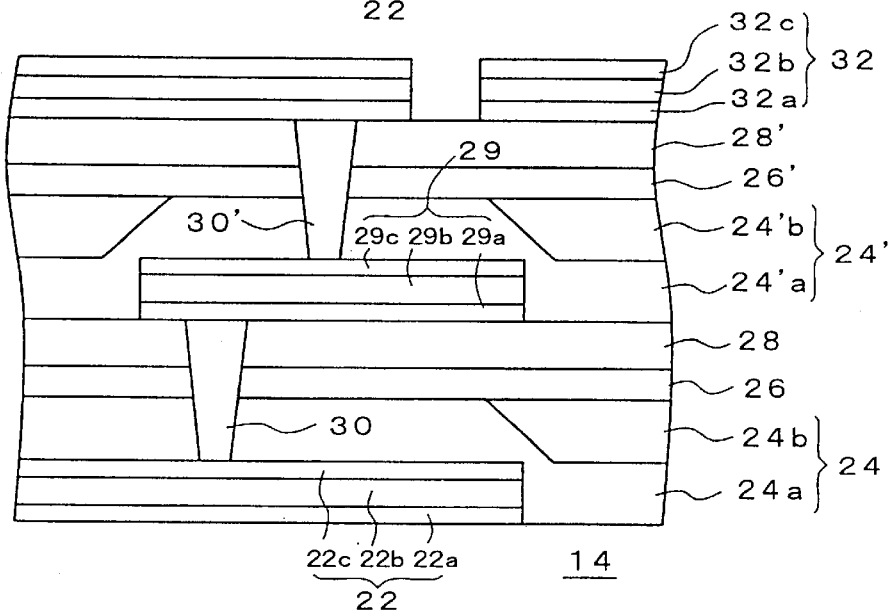

Next, as is shown in FIG. 4C, the contact hole is embedded by the adhesion layer and tungsten, and the adhesion layer and tungsten are removed by being polished the surface by the CMP method except for the contact holes, thereby forming the connecting conductor 30' exposing the upper portion thereof above the planarized interlayer insulating film 28'.

Next, the display electrode 32 is formed on the interlayer insulating film 28'. Aluminum or an aluminum alloy film is laminated on the titanium film to structure a material for the display electrode. Further, an alloy of aluminum and copper or an alloy containing additional titanium can be used as an aluminum alloy. In this embodiment, the TiN layer 32a, Ti layer 32b and AlCuTi layer 32c are laminated in this order to form the display electrode 32. TiN layer 32a, Ti layer 2b and AlCu layer 32c may be laminated in this order. In both cases, the display electrode 32 has a structure where the Ti layer is provided in contact with the AlCuTi layer or the AlCu layer of the most upper layer from the lower position. In this way, a display contrast is improved by improving the reflectance.

In FIG. 4C the tungsten (W)-plug is used for forming the connecting conductor 30' connecting the metal layer 29 with the display electrode 32 from the similar reason to using the tungsten (W)-plug for forming the connecting conductor 30 connecting the above-mentioned source electrode 22 with the metal layer 29.

With respect to the silicon substrate 1 formed as above, the glass substrate 40 where the opposing electrode 38 is formed by the process similar to the conventional one is overlaid, so completing the reflection type liquid crystal display by sealing the liquid crystal. It should be noted that, in this embodiment, though the metal layer 29 is provided between the display electrode 32 and the source electrode 22 as an inter-wire layer, the inter-wire layer can be of course omitted as long as the positions of the display electrode 32 and the source electrode 22 coincide.

As described hereinbefore, the liquid crystal display substrate and the liquid crystal display according to this embodiment have the reflection preventing films 26 and 26' made of an insulating material. Further, in the fabricating method of the liquid crystal display substrate according to this embodiment, since the wire layer such as the source electrode 22 or the metal layer 29 has been already formed before the process forming the insulating reflection preventing films 26 and 26', it is difficult to form the films by a high temperature process. Therefore, the P-CVD method is used for forming the films of the reflection preventing films 26 and 26' because the films can be deposited under a relatively low temperature.

Further, the film deposition using the P-CVD method is easily receives an influence of the surface contour of the lower layer and if the film is formed on the lower layer having extreme irregularities on the surface, areas which can not deposit enough are remained as a void. Therefore, it is unfavorable to form the insulating reflection preventing films 26 and 26' on the surface of the source electrode 22 or the metal layer 29 by simply using the P-CVD method. Therefore, in this embodiment, a first insulating films (interlayer insulating films 24 and 24' in an above example) the surface of which is planarized as much as possible is formed as a lower layer for forming the insulating reflection preventing films 26 and 26' by the P-CVD method. As the first insulating film, the P-SiO film or the HDP-SiO film can be used. Though the step difference of the lower layers can be reduced by simply depositing these films, the reflection preventing films 26 and 26' which do not have any voids and the like and are extremely superior in flatness can be acquired by further performing a planarization process such as the CMP method. As the planarization process, other polishing methods or the SOG coating to the film surface can be adopted.

The insulating film at each portion mentioned above can be timely planarized. As a planarization method, a polishing process or an etch back process after the coating of the SOG can be adopted.

Since the insulating film at each portion performs a plasma depositing method having less voids, the planarization can be made for improvement in reflectance of the display electrode. Further, as the planarization method, a method for planarizing by polishing the insulating film formed thick to a desired film thickness or a etch back method in which a flat surface contour is transcribed to the surface of the insulating film by uniformly etching the whole surface after making a flat surface contour by applying the SOG on the surface of the insulating film can be used.

The present invention can supply various deformations without being limited to the above embodiment.

Figure 5:
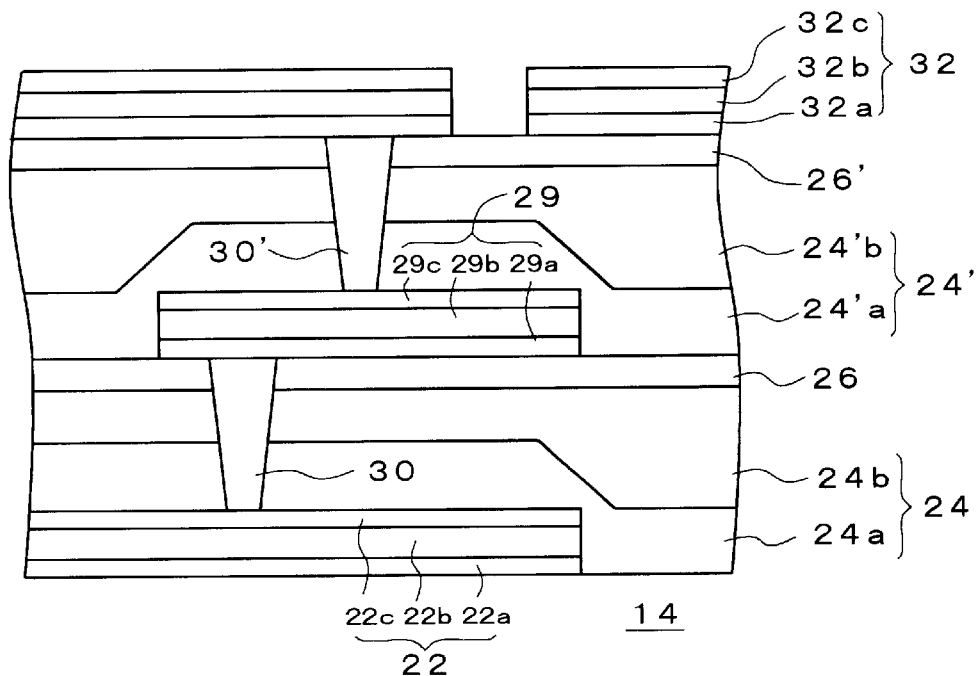
FIG. 5 is a partial cross sectional view showing a structure of a deformation example of the reflection type liquid crystal display (substrate) according to an embodiment of the present invention.

For example, though the interlayer insulating films 28 and 28' are formed on the reflection preventing films 26 and 26' in the above embodiment as shown in FIG. 2, the present invention is not limited to this and the metal layer 29 and the display electrode 32 may be formed directly on the reflection preventing films 26 and 26' without forming the interlayer insulating films 28 and 28' as shown in FIG. 5.

Since the reflection preventing film 106' described in the "description of the related art" is structured by metal materials, the display electrode 112 can not be provided unless the insulating film is provided on the surface of the reflection preventing film. However, in the present invention, since the reflection preventing film 26' is insulating, no shortage occurs between each display electrode 32 even if the display electrode 32 is formed directly on the surface thereof. According to this, a reduction effect of a process step can be achieved.

Of course, as shown in FIG. 1, the display electrode 32 can be provided on the reflection preventing film 26' via the insulating film. According to this, even if some problems (when the moisture resistance is low or there is a possibility of a crack generation) exist in film quality of the reflection preventing film, it is possible to suppress the appearance thereof.

A structure in FIG. 5 shows that after forming the P-SiO films 24b and 24'b on the HDP-SiO films 24a and 24'a, the surfaces of the P-SiO films 24b and 24'b are polished to be planarized and then the reflection preventing films 26 and 26' of the P-SiN film or the P-SiON film are formed on the P-SiO film 24b and 24'b.

Figure 6:
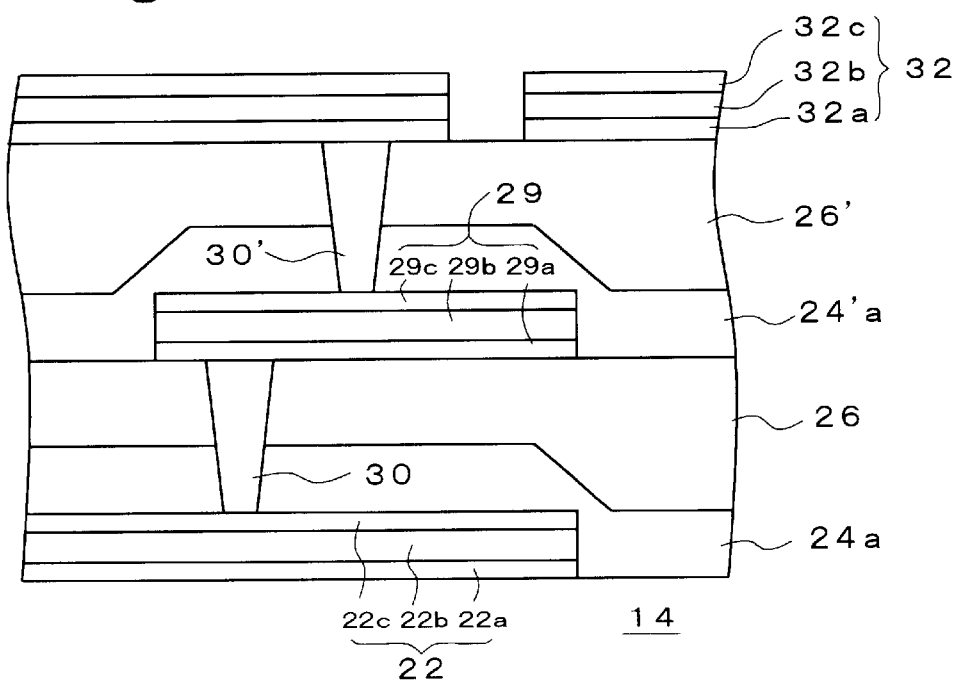
FIG. 6 is a partial cross sectional view showing a structure of a deformation example of the reflection type liquid crystal display (substrate) according to an embodiment of the present invention.

Further, the present invention can also be applied to a structure shown in FIG. 6. The structure in FIG. 6 forms the reflection preventing films 26 and 26' on the HDP-SiO films 24a and 24'a without forming the interlayer insulating films 26 ad 28' and P-SiO films 24b and 24'b. The metal layer 29 and the display electrode 32 are formed after polishing the surface of the reflection preventing films 26 and 26' by the CMP method. In this case, the first insulating films are the HDP-SiO fims 24a and 24'a.

Figure 7:
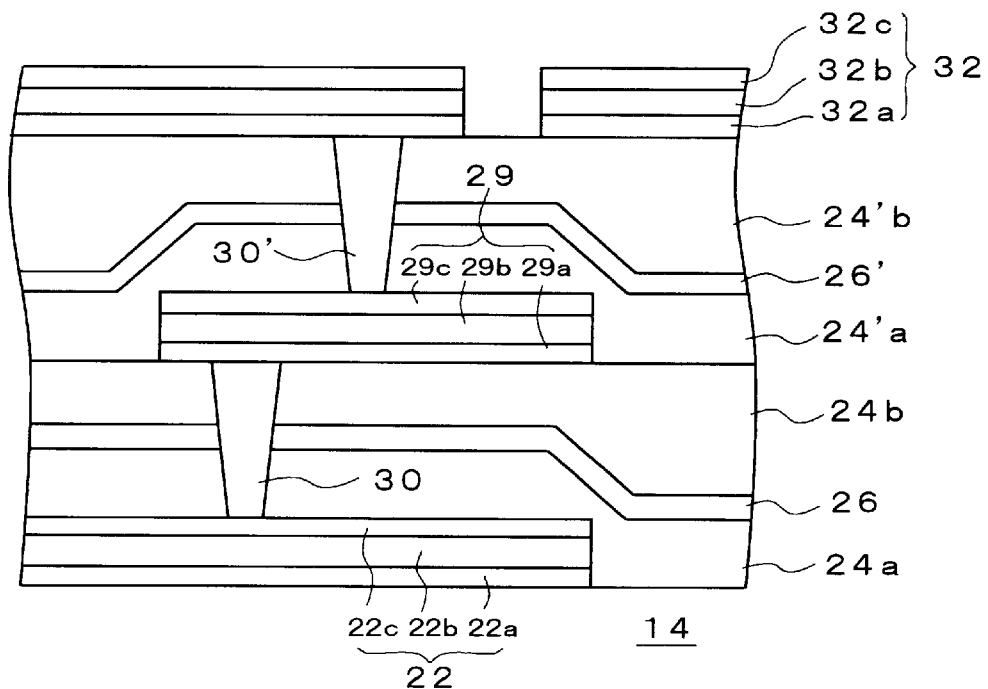
FIG. 7 is a furthermore partial cross sectional view showing a structure of a deformation example of the reflection type liquid crystal display (substrate) according to an embodiment of the present invention.

Further, the present invention can also be applied to a structure shown in FIG. 7. The structure shown in FIG. 7 is a structure in which the reflection preventing film 26 is sandwiched between the HDP-SiO films 24a and P-SiO film 24b, and the reflection preventing film 26' is sandwiched between the HDP-SiO film 24'a and P-SiO film 24'b. The first insulating films in this case are the HDP-SiO films 24a and 24'a. The metal layer 30 and the display electrode 32 are formed after polishing the surfaces of the P-SiO films 24b and 24'b by the CMP and the like.

Figure 8:
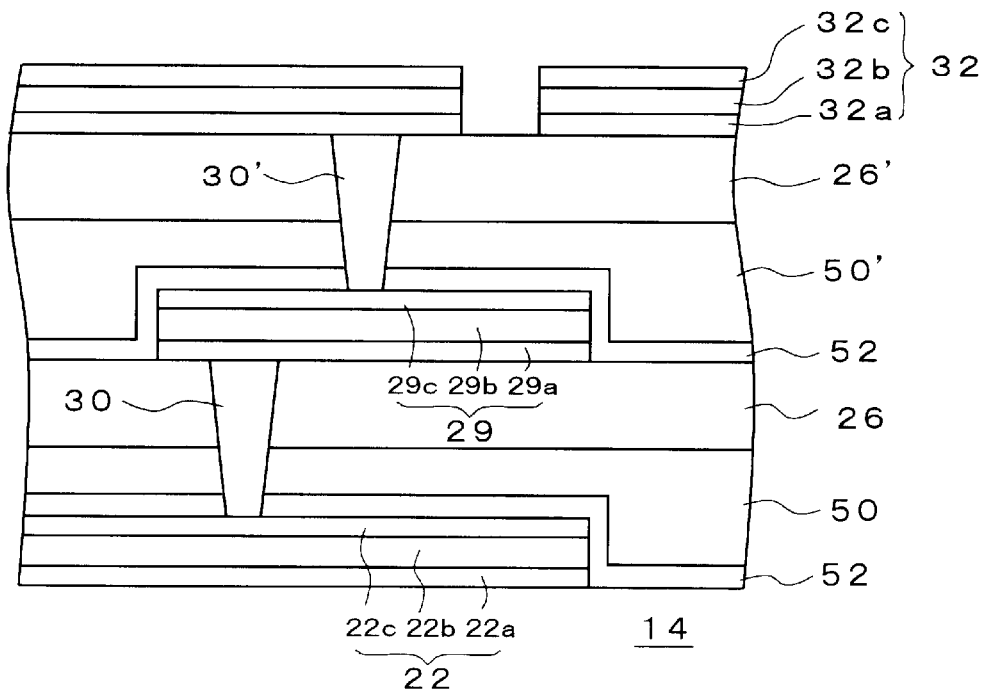
FIG. 8 is a further partial cross sectional view showing a structure of a deformation example of the reflection type liquid crystal display (substrate) according to an embodiment of the present invention.
Figure 9:
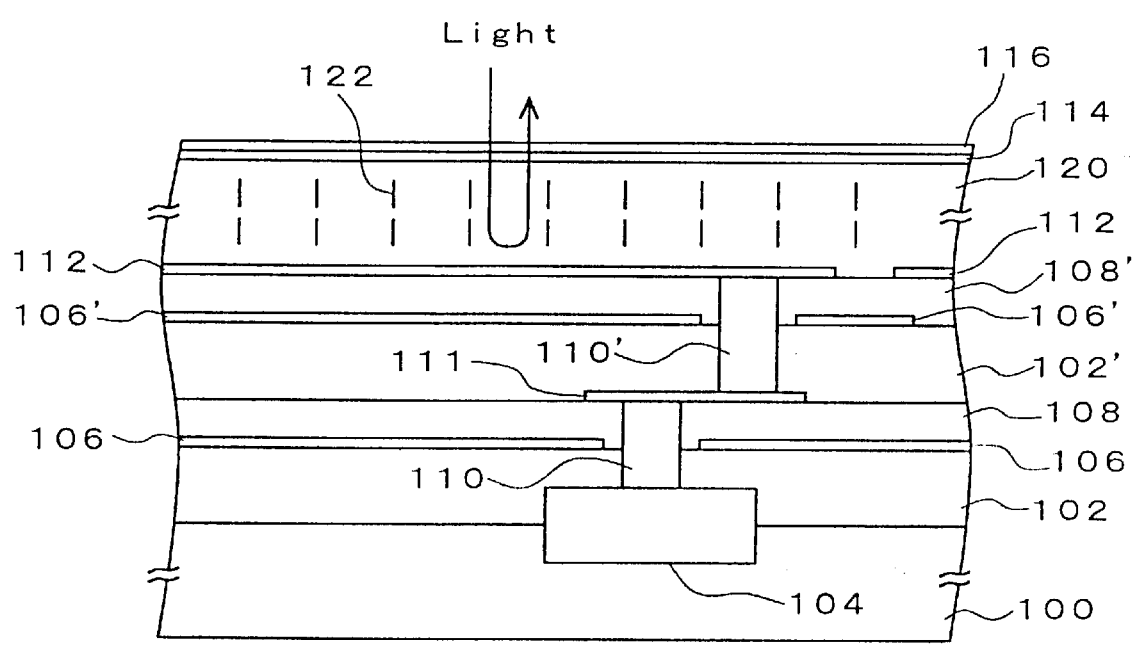
FIG. 9 is a partial cross sectional view showing a schematic structure of the conventional reflection type liquid crystal display.

Further, the present invention can furthermore be applied to a structure shown in FIG. 8. The structure shown in FIG. 8 has a feature in the point that SOG films 50 and 50 are used for the interlayer insulating films. As shown in FIG. 8, a P-SiO 52 is formed on the interlayer insulating film 14 and the upper surface of the source electrode 22. The P-SiO film 52 can be replaced with the P-SiN film or P-SiON film. Next, after hardening the SOG film 50 by applying, the upper surface is polished to be planarized by the CMP method or the like and then the reflection preventing film 26 is formed. The reflection preventing film 26 is formed flat according to the flatness of the lower layer. As is the case of the above embodiment, after forming the connecting conductor 30 made of tungsten at the contact hole, the metal layer 29 is formed on the reflection preventing film 26. After forming the P-SiO film 52 on the metal layer 29 and the reflection preventing film 26, the SOG film 50' is applied to be hardened and the reflection preventing film 26' is formed by polishing the upper surface by the CMP method and the like to planarize the surface. The reflection preventing film 26' is formed flat according to the flatness of the lower layer. The display electrode 32 is formed on the reflection preventing film 26 after forming the connecting conductor 30' made of tungsten at the contact hole.

Thus, the present invention can also use the SOG film instead of the inter-wire embedding by the HDP-CVD method.

Since the SOG is superior in flatness, it is possible to dissolve irregularities even if the irregularities remain on the surface of the reflection preventing film. Further, the SOG itself can have a light absorption character by dispersing dyestuffs in SOG.

Also, a silicon nitride film, silicon nitride oxide film, the SOG which disperses dyestuffs or the like can be used as a material for the reflection preventing film.

As is above-mentioned, according to the present invention, the liquid crystal display substrate and the fabricating method thereof and the liquid crystal display which surely absorb the incident light from the gap of the display electrodes and prevent the deterioration of the color tone of the reflected light and the like can be realized.

What is claimed is:

1. A fabricating method of a liquid crystal display substrate comprising the steps of:

forming a first insulating film on an electrode connected to a switching element, the first insulating film having a more planarized surface than a step difference made by the electrode;

forming an insulating reflection preventing film on the first insulating film, wherein by changing the deposition condition of gas discharge ratio, radio frequency output, pressure in a chamber, or deposition temperature, a desired refractive index or attenuation coefficient can be obtained for the insulating reflection preventing film;

forming a through-hole which passes through the reflection preventing film and the first insulating film and exposes a connecting portion of the electrode; and forming a display electrode on an upper layer side of the reflection preventing film, the display electrode having a function for reflecting an incident light and being connected to the electrode via a connecting conductor provided in contact with an inner surface of the through-hole.

2. A fabricating method of a liquid crystal display substrate as set forth in claim 1, wherein the display electrode is directly formed on a surface of the reflection preventing film.

3. A fabricating method of a liquid crystal display substrate as set forth in claim 1, further forming a second insulating film on an upper layer of the reflection preventing film and forming the display electrode on the second insulating film.

4. A fabricating method of a liquid crystal display substrate as set forth in claim 3, wherein a SOG film is used for the second insulating film.

5. A fabricating method of a liquid crystal display substrate as set forth in claim 1, further forming a wire layer on the reflection preventing film and forming the display electrode on the wire layer.

6. A fabricating method of a liquid crystal display substrate as set forth in claim 3, wherein a planarization process of the first or second insulating film comprises a polishing process, a coating process of SOG or an etch back process after the SOG coating.

7. A fabricating method of a liquid crystal display substrate as set forth in claim 1, wherein the reflection preventing film is made by at least one of a silicon nitride film, a silicon nitride oxide film or a SOG film dispersing dyestuffs.

8. A fabricating method of a liquid crystal display substrate as set forth in claim 1, wherein the display electrode is formed by laminating aluminum or aluminum alloy film on titanium film, and the aluminum alloy including an alloy of aluminum and copper or including the alloy of aluminum and copper with titanium.

9. A liquid crystal display substrate comprising:

a first insulating film provided on an electrode connected to a switching element, the first insulating film having a more planarized surface than a step difference made by the electrode;

an insulating reflection preventing film having a refractive index equal to 1.98–2.24 and an attenuation coefficient equal to 0.47–0.636 provided on the first insulating film; and a display electrode provided on an upper layer side of the reflection preventing film, the display electrode having a function for reflecting an incident light and connected to the electrode via a connecting conductor provided in contact with an inner surface of a through-hole passing through the reflection preventing film and the first insulating film.

10. A liquid crystal display comprising:

a first insulating film arranged on an electrode connected to a switching element, the first insulating film having a more planarized surface than a step difference made by the electrode;

an insulating reflection preventing film having a refractive index equal to 1.98–2.24 and an attenuation coefficient equal to 0.47–0.636 provided on the first insulating film;

a display electrode provided on an upper layer side of the reflection preventing film, the display electrode having a function for reflecting an incident light and connected to the electrode via a connecting conductor provided in contact with an inner surface of a through-hole passing through the reflection preventing film and the first insulating film; and an opposing electrode provided on the display electrode sandwiching a liquid crystal layer.

11. A liquid crystal display substrate comprising:

a plurality of display electrodes being able to apply an electric field on a liquid crystal layer sandwiched between the display electrodes and an opposing electrode when the display electrodes are arranged opposing the opposing electrode;

an insulating reflection preventing film having a refractive index equal to 1.98–2.24 and an attenuation coefficient equal to 0.47–0.636 provided on a lower layer side of a plurality of the display electrodes; and a through-hole passing through the reflecting preventing film and introducing a connecting conductor to a lower layer side of the reflecting preventing film.

12. A liquid crystal display comprising:

a plurality of display electrodes having a function as a light reflection film for reflecting an incident light;

an opposing electrode provided sandwiching a liquid crystal layer on a plurality of the display electrodes;

an insulating reflection preventing film having a refractive index equal to 1.98–2.24 and an attenuation coefficient equal to 0.47–0.636 provided at least on a lower layer between a plurality of the display electrodes; and a through-hole passing through the reflecting preventing film and introducing a connecting conductor to a lower layer side of the reflecting preventing film.

* * * * *